(12) United States Patent
Le Roy et al.

(10) Patent No.: US 8,106,876 B2
(45) Date of Patent: Jan. 31, 2012

(54) COLOUR DISPLAY DEVICE WITH BACKLIGHTING UNIT USING ORGANIC LIGHT-EMITTING DIODES AND METHOD OF IMPLEMENTATION

(75) Inventors: Philippe Le Roy, Betton (FR); Valter Drazic, Betton (FR); Jean-Paul Dagois, Cesson Sevigne (FR)

(73) Assignee: Thomson Licensing, Boulogne-Billancourt (FR)

( * ) Notice: Subject to any disclaimer, the term of this patent is extended or adjusted under 35 U.S.C. 154(b) by 864 days.

(21) Appl. No.: 11/596,748

(22) PCT Filed: May 13, 2005

(86) PCT No.: PCT/FR2005/050321
§ 371 (c)(1),
(2), (4) Date: Nov. 16, 2006

(87) PCT Pub. No.: WO2005/114311
PCT Pub. Date: Dec. 1, 2005

(65) Prior Publication Data
US 2008/0061703 A1 Mar. 13, 2008

(30) Foreign Application Priority Data
May 17, 2004 (FR) ..................................... 04 50952

(51) Int. Cl.
*G09G 3/36* (2006.01)
(52) U.S. Cl. ...................................... 345/102; 362/97.1
(58) Field of Classification Search .................. 345/102; 359/462–464, 642, 652–654; 362/97.1
See application file for complete search history.

(56) References Cited

U.S. PATENT DOCUMENTS

| 5,598,281 A | 1/1997 | Zimmerman et al. |
| 5,796,509 A | 8/1998 | Doany et al. |

(Continued)

FOREIGN PATENT DOCUMENTS

EP   1380876   1/2004

(Continued)

OTHER PUBLICATIONS

Search Report Dated Sep. 30, 2005.

(Continued)

*Primary Examiner* — Chanh Nguyen
*Assistant Examiner* — Allison Walthall
(74) *Attorney, Agent, or Firm* — Robert D. Shedd; Jeffrey M. Navon

(57) ABSTRACT

The invention relates to a color display device with backlighting unit using organic light-emitting diodes and to a method of implementation. The color display device comprises, from rear to front towards an observer, a multicolor backlighting unit using organic light-emitting diodes and an electro-optical array for switching of the backlighting by pixels, the backlighting unit being a surface comprising a periodic pattern of a group of at least three adjacent illuminating lines of different base colors that are parallel to each other. According to the invention, the pixels of the switching array and the illuminating lines of the backlighting unit are substantially aligned in order that a given pixel allows the forward transmission of only the corresponding base color to be controlled and that a cylindrical lens is disposed along each illuminating line on the backlighting unit in order to form a light beam with substantially parallel edges directed towards the front and through the switching array, the lens having a length substantially equal to the length of the illuminating line.

9 Claims, 2 Drawing Sheets

U.S. PATENT DOCUMENTS

| | | | |
|---|---|---|---|
| 6,111,560 A | 8/2000 | May | |
| 6,115,187 A * | 9/2000 | Tabata et al. | 359/654 |
| 7,113,163 B2 * | 9/2006 | Nitta et al. | 345/102 |
| 2002/0158574 A1 * | 10/2002 | Wolk et al. | 313/504 |
| 2003/0011884 A1 * | 1/2003 | Van Berkel | 359/464 |
| 2003/0161040 A1 * | 8/2003 | Ishii et al. | 359/463 |
| 2005/0152155 A1 * | 7/2005 | Kang et al. | 362/558 |
| 2006/0192747 A1 * | 8/2006 | Yoon et al. | 345/102 |

FOREIGN PATENT DOCUMENTS

| | | | |
|---|---|---|---|
| JP | 7253754 A | | 10/1995 |
| JP | 1995253574 | | 10/1995 |
| JP | 09-080434 | * | 3/1997 |
| JP | 2002303858 | | 10/2002 |
| JP | 2002365632 | | 12/2002 |
| JP | 2003005164 | | 1/2003 |
| JP | 2003177211 | | 6/2003 |
| JP | 03-075617 | * | 9/2003 |
| JP | 2003332071 | | 11/2003 |
| JP | 2003338369 | | 11/2003 |
| JP | 2004045771 | | 2/2004 |
| WO | WO 99/66483 | | 12/1999 |

OTHER PUBLICATIONS

Bass et al., "Handbook of Optics", Optical Society of America, vol. 1—Fundamentals, Techniques, and Design, Second Edition.

* cited by examiner

COLOUR DISPLAY DEVICE WITH BACKLIGHTING UNIT USING ORGANIC LIGHT-EMITTING DIODES AND METHOD OF IMPLEMENTATION

CROSS-REFERENCE TO RELATED APPLICATIONS

This application claims the benefit, under 35 U.S.C. §365 of International Application PCT/FR05/050321, filed May 13, 2005, which was published in accordance with PCT Article 21(2) on Dec. 1, 2005 in French and which claims the benefit of French patent application No. 0450952, filed May 17, 2004.

BACKGROUND OF THE INVENTION

Description Of Related Art Including Information Disclosed Under 37 CFR 1.97 and 1.98.

The present invention relates to a colour display device with backlighting unit using organic light-emitting diodes and also to a method of implementation of the said display device. It has applications in the field of electrically or electronically controlled displays in which a light beam or light beams produced by one or more light sources is/are optically switched by pixels in order to control the display of the light. It can more particularly be applied to liquid crystal displays (LCD) or displays using optical switching by micro-actuators (MEMS).

Displays implementing electro-optical switching arrays (or electro-optical modulators, these terms being equivalent), notably liquid crystal displays (LCD), are undergoing a significant development. In order to allow them to be used whatever the ambiant lighting conditions, a light source is required on which the electro-optical switching array can act. For this reason, in the case of colour LCD displays, it has been proposed to illuminate the LCD switching array from the rear (with respect to an observer situated in front of the display) with one or more cold cathode lighting tubes. Aside from the fact that their implementation is complicated, owing to the high voltage needed for their operation, and to the necessity of having a uniform distribution of light, they are fragile, have a limited lifetime (their characteristics degrade over time) and are power-hungry. In addition, since they produce white light, additional optical filtering devices are required in order to reproduce the whole of the visible colour spectrum on the display.

Other techniques for producing a backlighting have therefore been sought. Accordingly, after using light-emitting diodes, the implementation of organic light-emitting diodes (OLED) has been proposed. The latter technology, which allows three base spectral colours, red, green and blue (RGB), to be individually produced, and which, contrary to technologies of the cold cathode tube type, can be directly implemented at the rear of the LCD electro-optical switching array, allows the design of such displays to be simplified.

However, this technology still suffers from some limitations. Indeed, in known backlighting devices using OLEDs, the three RGB light sources are superimposed (stacked up) which then requires them to be turned on sequentially over time. The retinal persistence of the observer allows the selected colours to be recombined and the visible spectrum to be reproduced. Owing to the sequential power up, switching losses are generated. These are more significant the higher the capacitances to be switched owing to the fact that the layers of material forming the OLEDs are very thin. The superimposition of the sources also leads to losses of luminous intensity.

As an alternative, in U.S. Pat. No. 6,111,560, the implementation of rows of linear light sources was proposed, each one having a width such that several rows of the LCD switching array could act on the light produced by one illuminating line of the source. Lastly, in U.S. Pat. No. 5,796,509, the implementation of a lighting means was proposed that uses organic light-emitting diodes combined with a spatial optical modulator of the LCD type. Colour displays are described therein in which either the OLEDs produce white light and colour filters are employed or colour OLEDs are employed.

Other documents US2003/0030371 and WO99/66483 describe colour display devices equipped with this backlighting technology.

These various solutions still have limitations, especially relating to the accuracy of the optical reproduction or to the complexity of implementation and the present invention proposes to solve such problems, amongst others. Thus, a subject of the invention is a colour display device comprising, from rear to front towards an observer, a multicolour backlighting unit using organic light-emitting diodes (OLED) and an electro-optical array for the switching of the backlighting by pixels, the backlighting unit being a surface comprising a periodic pattern of a group of at least three adjacent illuminating lines of different base colours that are parallel to each other.

BRIEF SUMMARY OF THE INVENTION

According to the invention, the pixels of the switching array and the illuminating lines of the backlighting unit are substantially aligned in order that a given pixel allows the forward transmission of only the corresponding base colour to be controlled, and a cylindrical lens is disposed along each illuminating line on the backlighting unit in order to form a light beam with substantially parallel edges directed towards the front and through the switching array for the corresponding base colour, the lens having a length substantially equal to the length of the illuminating line.

In various embodiments of the invention, the following means, which can be used alone or according to all the combinations that can be technically envisaged, are employed:
  the electro-optical switching array comprises, towards the front and the observer, a substantially plane diffuser element, the diffuser element and the surface containing the lines of the backlighting unit, which is substantially plane, are optically conjugated through the said lenses,
  the cylindrical lenses have their convex side oriented towards the front and the switching array,
  the cylindrical lenses are laterally separated from each other along their length by optical separators in order that the illumination from one illuminating line cannot interfere with the pixels of other lines,
  the optical separators are optical absorbers designed to absorb the light from an illuminating line that does not fall on the cylindrical lens corresponding to the line,
  the cylindrical lenses are mounted directly onto the optical switching array,
  the cylindrical lenses are separated by an air space from the optical switching array,
  the cylindrical lenses are made of a plastic material, such as polymethylmethacrylate (PMMA), polycarbonate or polyacrylic,
  the electro-optical switching array is an active matrix,
  the electro-optical switching array is of the liquid crystal (LCD) type,
  the electro-optical switching array is of the micromechanical (MEMS) type, the backlighting unit is of a type chosen between common anode and common cathode and is preferably of common cathode type, the organic light-emitting diodes (OLED) comprise, towards the front, a transparent or semi-transparent electrode of a first kind through which the light produced passes and, towards the rear, an electrode of a second kind, the kinds of electrodes corresponding to anode and cathode, the electrodes of one of the kinds of the illuminating lines of the same base colour, called line electrodes, being connected together and to at least one colour control connection for the corresponding base colour, the electrodes of the other kind for all of the illuminating lines being connected together, forming a common electrode, and to at least one common control connection, (the line electrodes are preferably linked along the edges of the unit; a control or common connection corresponds to one connector pin of the display)

the line electrodes for the same base colour are connected together at only one end of the illuminating lines of the base colour, (preferably along the end edge of the backlighting unit; for the three colours, two to a first end and the third to the other end of the lines)

the device comprises at least one pair of colour control connections per base colour, the first connection of the pair being at a first end of the line electrodes of the corresponding base colour and the second connection of the pair being at a second end of the same line electrodes of the corresponding base colour, the second end being opposite to the first end along the illuminating lines, the line electrodes of the same base colour being connected together at each of the two ends of the illuminating lines, (preferably along one edge of the unit)

the line electrodes of the same base colour are connected together at the two opposing ends of the illuminating lines of the base colour, (along the edges of two opposing ends of the backlighting unit), the transparent or semi-transparent electrode comprises a layer of indium-tin oxide (ITO), the transparent or semi-transparent electrode comprises a chrome layer, (in order to overcome the low conductivity of ITO)

the electrode at the rear of the backlighting unit results from a deposition of a metal chosen from aluminium, silver, gold, chrome or magnesium, the pixels of the optical switching array are aligned in columns, the columns being parallel to the illuminating lines, for the backlighting unit, the width of an illuminating line is around 12.5 micrometers, for the cylindrical lenses, the thickness at the maximum thickness of the lens is around 0.2 mm with a radius of curvature of −0.088395 mm and a conicity of −0.2056, the optical absorbers being configured for absorbing the lateral light rays emitted by the illuminating line outside of a cone of around ±14 degrees with respect to a median plane of forward emission of the illuminating line, for a switching array of the liquid crystal type, the pixel width is around 0.1 mm, the liquid crystal being held between two plates each of around 0.7 mm in width, the group comprises three illuminating lines, the three base colours are blue, green and red.

Another subject of the invention is a method for the implementation of a colour display device comprising, from rear to front towards an observer, a multicolour backlighting unit using organic light-emitting diodes (OLED) and an electro-optical array for switching of the backlighting by pixels, the backlighting unit being a surface comprising a periodic pattern of a group of at least three adjacent illuminating lines of different base colours that are parallel to each other, in which a device according to one or more of the aforementioned features is implemented, the pixels of the switching array and the illuminating lines of the backlighting unit being substantially aligned in order that a given pixel allows the forward transmission of only the corresponding base colour to be controlled and in that all the illuminating lines are simultaneously turned on at the same time, the display colour for the observer being controlled by the electro-optical switching array.

According to various operational modes, the above method is considered with one or more of the following features:

a cylindrical lens is disposed along each illuminating line on the backlighting unit in order to form a light beam with substantially parallel edges directed towards the front and through the switching array for the corresponding base colour, the lens having a length substantially equal to the length of the illuminating line, organic light-emitting diodes (OLED) are implemented that comprise, towards the front, a transparent or semi-transparent electrode of a first kind through which the light produced passes and, towards the rear, an electrode of a second kind, the kinds of electrodes corresponding to anode and cathode, the electrodes of one of the kinds of the illuminating lines of the same base colour, called line electrodes, being connected together and to at least one colour control connection for the corresponding base colour, the electrodes of the other kind for all of the illuminating lines being connected together, forming a common electrode, and to at least one common control connection, an active matrix electro-optical switching array is implemented, the three illuminating lines, at least, of the group allow a white colour to be produced for an observer by optical combination and the white balance is adjusted at least by controlling the respective luminous intensities of the base colours simultaneously produced by the illuminating lines, the white balance is adjusted by controlling the quantity of light passing through the pixels of the electro-optical switching array, the white balance is adjusted by controlling the respective luminous intensities of the base colours produced by the illuminating lines and by controlling the quantity of light passing through the pixels of the optical switching array.

Amongst other advantages, the present invention allows a relatively simple adjustment of the white balance and avoids the need for implementation of colour filters upstream (or downstream) of the electro-optical switching array.

BRIEF DESCRIPTION OF THE SEVERAL VIEWS OF THE DRAWINGS

The present invention will now be exemplified, without however being limited to it, by the description that follows relating to the following figures.

DETAILED DESCRIPTION OF THE INVENTION

The backlighting unit 1 using organic light-emitting diodes (OLED) is a substantially plane and square or rectangular structure formed from layers of materials designed to generate light by the action of an electric current. The manufacture of such a unit can use traditional fabrication techniques for OLEDs. By way of example, an OLED can comprise a substrate onto which a first electrode is deposited, above which is a layer of organic light-emitting material which itself is covered by a second electrode layer. Sub-layers can be incorporated into the layer of organic light-emitting material in order to promote the electro-photonic conversion. Depending on fabrication modes, the OLED emission can take place from the rear (through the substrate) or from the front (through the second electrode). In addition, depending on the kind of the electrodes, anode or cathode, the anode can be at the front or vice versa. The electrodes that must be transparent to the light produced by the OLED, conventionally the anodes, are generally thin films of indium-tin oxide (ITO) whose electrical characteristics can be improved, in particular reduction of the sheet resistance, by deposition of chrome.

Figure 1:
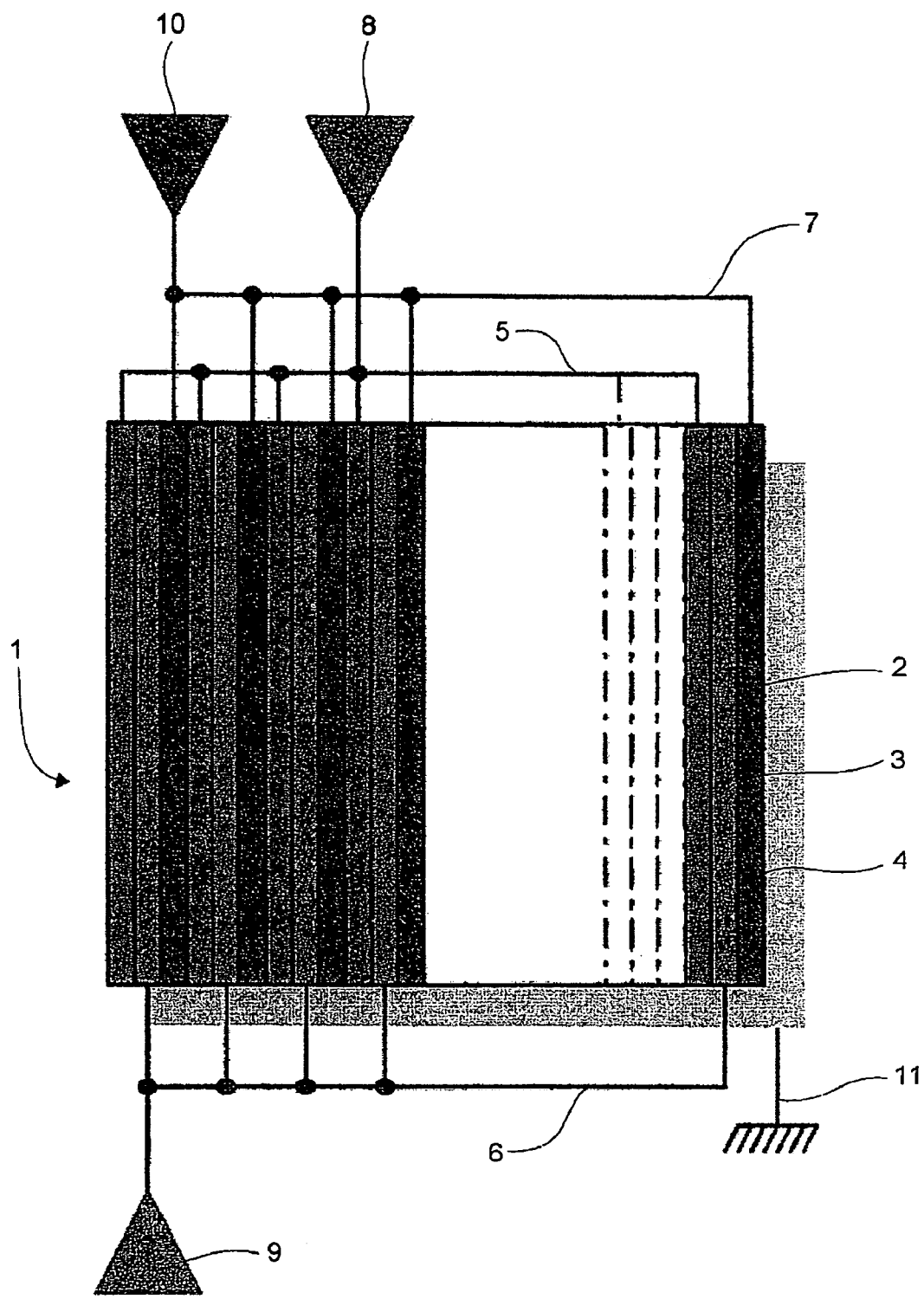
FIG. 1 that shows a schematic top view of a backlighting unit according to the invention, and FIG. 2 that shows schematically the operational implementation of the backlighting unit within a display of the liquid crystal (LCD) type.

The backlighting unit of the invention such as can be seen schematically in FIG. 1, of the frontal emission type and with rear common cathode, however has a special configuration, namely a regular periodic repetition of an elementary pattern of three adjacent illuminating lines of OLEDs that are parallel to each other, each one being of a base colour, red 2, green 3 and blue 4, on the substantially microscopically plane surface of the unit. Each of the base colour lines of an elementary pattern has its own electrode at least on one face of the unit, here a frontal anode forming the line electrode, the other face of the unit having an electrode that is common to all the illuminating lines, here a rear common cathode 11.

The electrodes, here frontal anodes, of the various lines of the same base colour, called line electrodes, are joined together along one end of the unit 1, for red at the link 5, for green at the link 6 and for blue at the link 7. Each of the links is connected to a colour control connection or connector pin (for the base colour being considered), respectively 8, 9 and 10, that is designed to be connected to external electronic illumination control circuits not shown. All of the OLED lines of the same base colour can thus be turned on. In a preferred manner for the implementation of the backlighting unit, the entirety of the OLED lines, in other words the three base colours together, can also be simultaneously turned on. It will be noted that, given that there are three base colours and therefore three links 5, 6, 7, the said links have been distributed at either end of the illuminating lines, one at one end and two at the other end. Such an arrangement simplifies the fabrication of the links since only one insulating layer is required between the two links as compared to an arrangement where the three links would be on the same side.

In one variant, three links can be formed at both ends with their respective connections/connector pins in order to reduce the resistance of the circuits, to power the electrodes at both ends of the lines and to have an improved uniformity of the luminous emission. Indeed, the electrodes must be thin in order to transmit the light generated in the OLEDs, leading to a high resistance and voltage drop along the illuminating line, which can cause a reduction in the luminous emission towards an end of the illuminating line that is not connected relative to the connected end. The device therefore comprises one pair of anode control connections per base colour, the first connection of the pair being at a first end of the illuminating lines of the corresponding base colour, and the second connection of the pair being at a second end of the illuminating lines of the corresponding base colour, the second end being opposite to the first end, the anodes of the illuminating lines of the same base colour being linked together at either end of the illuminating lines.

Figure 2:
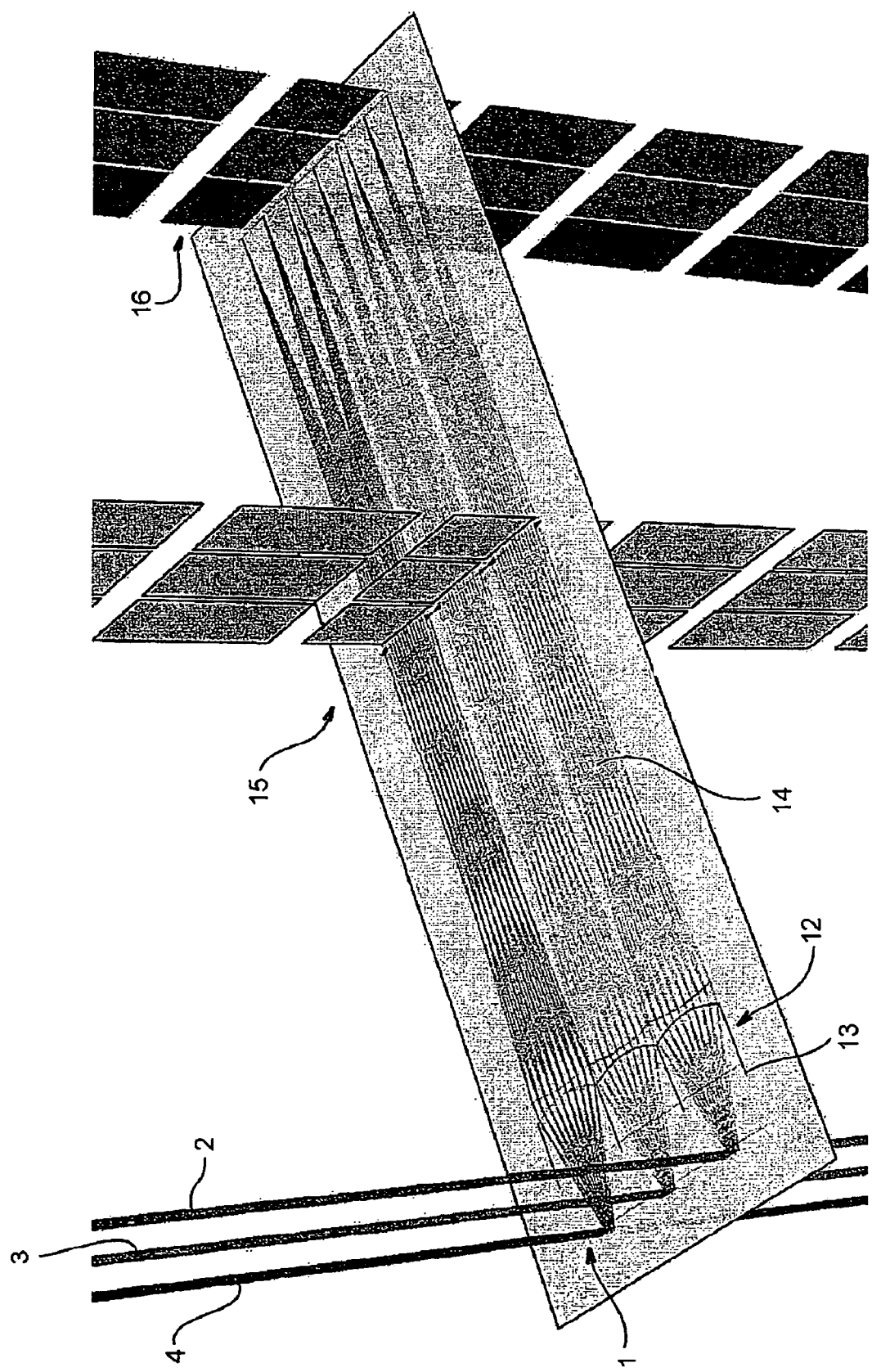

On the unit such as is described above, an array of elongated cylindrical lenses 12 has been disposed, one lens per illuminating line 2, 3, 4, which can be seen more clearly in FIG. 2 showing schematically the operation of a display according to the invention. The convex face of the lenses is oriented upwards, away from the illuminating lines. Each lens is designed to form, in the forward direction, a light beam of a given base colour with substantially parallel sides.

Optical separators 13 have been disposed between the lenses, along their common lateral edges (and along the edges of the backlighting unit), in order that the illumination from an illuminating line may not interfere with that from the other illuminating lines. The optical separators are preferably optical absorbers designed to absorb the light from an illuminating line that does not fall onto the elongated cylindrical lens corresponding to the line.

The effect of the elongated cylindrical lenses is now explained in relation to FIG. 2 where a backlighting unit 1 is disposed in a display behind an electro-optical switching array 15 of pixels of the liquid crystal (LCD) type. For simplicity, only three illuminating lines of one elementary pattern of three base colours, red, green and blue and the configuration of the light rays on a plane of transverse cross section have been shown. The illuminating lines 2, 3, 4, the cylindrical lenses 12 and the pixels of the LCD switching array 15 are aligned in order that a given pixel only controls a given base colour. Of all the light rays produced by the OLED illuminating lines, only those reaching the cylindrical lenses are transmitted in the form of light beams 14 with substantially parallel edges through the pixels of the LCD switching array, in the forward direction, in order to form patterns 16 (visible or otherwise, depending on the state of the control of the pixel or pixels and of the illuminating lines). Preferably, the cylindrical lenses are not mounted directly onto the rear face of the LCD switching array so as to leave an air space whose optical index allows an adequate curvature of the rays at the exit of the cylindrical lenses. In one variant whose goal is an optimum precision, the wavelength of the base colour can be taken into account for the calculation of the corresponding cylindrical lens so as to have the same optical effects for the three base colours and thus to avoid any astigmatism of the colours that could otherwise occur.

Again in relation to FIG. 2, it will be noted that the pixels of the optical switching array are aligned in columns that are parallel to the illuminating lines of the backlighting unit and that each light beam 14 of a base colour only relates to a single column of pixels of the optical switching array. Thanks to the action of the cylindrical lenses, each one being disposed over an illuminating line thus allowing a beam with substantially parallel edges to be produced through the switching array, a column of pixels can only act on its corresponding base colour produced by the corresponding line of the backlighting unit. Thus, a system equivalent to a Köhler lighting system is formed where all the light of a given base colour collected by a cylindrical lens only passes through the corresponding pixel column of the switching array and does not spill over onto the other pixel columns.

In a typical display according to the invention, the width of an illuminating line is around 12.5 micrometers for the backlighting unit and the elongated cylindrical lenses have a thickness at the maximum thickness of the lens of around 0.2 mm, a radius of curvature of −0.088395 mm and a conicity of −0.2056. The optical absorbers are configured for absorbing the lateral light rays emitted laterally by the illuminating line outside of a cone of around ±14 degrees with respect to a median emission plane of the illuminating line in the forward direction. Lastly, the switching array of the liquid crystal type has a pixel width of around 0.1 mm, the liquid crystal being held between two glass plates, each of around 0.7 mm thickness, onto which are deposited, on the opposite surface to the liquid crystal layer, polarization layers that form a crossed polarizer and analyzer. Preferably, one of the glass plates integrates an active matrix that provides a memory effect for each pixel or liquid crystal cell; for this purpose, this glass plate for example comprises, for each pixel, a region coated with amorphous silicon into which is etched a pixel circuit that is known per se and that is designed so as to obtain the memory effect.

While the cylindrical lenses and optical separators act on light rays produced in lateral directions (perpendicular) to the illuminating lines, it will be noted that, for the rays produced in directions included in the normal median plane of the illuminating line, the light produced does not need to be controlled (redirected or absorbed) and that any light up to ±90 degrees from the normal can be used.

As has already been indicated, during operation, all the illuminating lines, in other words the three base colours, are preferably turned on, while however adjusting the level of each base colour in order to form a white of the right quality (white balancing).

In one variant in which the goal is a better white uniformity over the whole surface of the backlighting unit, the surface of the unit can be divided into individually controlled regions of three base colours encompassing a certain number of adjacent elementary patterns of three base colours and with at least three connector pins per region.

It will be understood that the few exemplary embodiments presented above are purely indicative and that those skilled in the art may be able to construct other ones that would still remain within the scope of the invention. In particular, the backlighting unit may additionally comprise electronic control circuits that are integrated and that notably allow it to be controlled via a serial or parallel link. In the simplest case, the control can be analogue. In the case where electronic logic circuits (or even a microprocessor) are implemented by integration into the backlighting unit, the control could be digital (binary). Finally, in a more sophisticated version, closed-loop control means are envisaged, where one or more optical sensors measure the luminous emission of the backlighting unit in order to maintain it at a predetermined level which, if required, could be modified by external control.

The invention claimed is:

1. Colour display device comprising, from rear to front towards an observer, a multicolour backlighting unit using organic light-emitting diodes and an electro-optical array for the switching of the backlighting by pixels, the backlighting unit being a surface comprising a periodic pattern of a group of at least three adjacent illuminating lines of different base colours that are parallel to each other,
   wherein the pixels of the switching array and the illuminating lines of the backlighting unit are substantially aligned in order that any given pixel allows the forward transmission of only the base colour of the illuminating line aligned with this pixel,
   wherein a cylindrical lens is disposed along each illuminating line on the backlighting unit in order to form a light beam with substantially parallel edges directed towards the front and through the switching array for the corresponding base colour, the lens having a length substantially equal to the length of the illuminating line
   wherein the organic light-emitting diodes of each illuminating line comprise, towards the front, a transparent or semi-transparent electrode of a first kind through which the light produced passes and, towards the rear, an electrode of a second kind, the kinds of electrodes corresponding to anode and cathode,
   wherein the electrodes of one of the kinds of the illuminating lines of the same base colour, called line electrodes, are connected together and to at least one pair of colour control connections for the corresponding base colour, the electrodes of the other kind for all of the illuminating lines being connected together, forming a common electrode, and to at least one common control connection, and
   wherein the first colour control connection of the at least one pair for each base colour is towards a first end of the line electrodes of this base colour and the second connection of the at least one pair is towards a second end of the same line electrodes of this base colour, the second end being opposite to the first end along the illuminating lines, the line electrodes of the same base colour being connected together at each of the two ends of the illuminating lines.

2. Colour display device according to claim 1,
   wherein the electro-optical switching array comprises, towards the front and the observer, a substantially plane diffuser element,
   and wherein the diffuser element and the surface containing the lines of the backlighting unit, which is substantially plane, are optically conjugated through the said lenses.

3. Device according to claim 1, wherein the electro-optical switching array is an active matrix.

4. Device according to claim 1, wherein the cylindrical lenses are laterally separated from each other along their length by optical separators in order that the illumination from one illuminating line cannot interfere with the pixels of other lines.

5. Device according to claim 1, wherein the cylindrical lenses are mounted directly onto the optical switching array.

6. Device according to claim 1, wherein the cylindrical lenses are separated by an air space from the optical switching array.

7. Device according to claim 1, wherein the transparent or semi-transparent electrode comprises a layer of indium-tin oxide.

8. Device according to claim 7, wherein the transparent or semi-transparent electrode comprises a chrome layer.

9. Method for the driving of a colour display device comprising, from rear to front towards an observer, a multicolour backlighting unit using organic light-emitting diodes and an electro-optical array for switching of the backlighting by pixels, the backlighting unit being a surface comprising a periodic pattern of a group of at least three adjacent illuminating lines of different base colours that are parallel to each other,
   wherein the pixels of the switching array and the illuminating lines of the backlighting unit are substantially aligned in order that a given pixel allows the forward transmission of only the base colour of the illuminating lines aligned with this pixel
   wherein all the illuminating lines are simultaneously turned on at the same time, the display colour for the observer being controlled by the electro-optical switching array,
   wherein the organic light-emitting diodes comprise, towards the front, a transparent or semi-transparent electrode of a first kind through which the light produced passes and, towards the rear, an electrode of a second kind, the kinds of electrodes corresponding to anode and cathode, wherein, the electrodes of one of the kinds of the illuminating lines of the same base colour, called line electrodes, are connected together and to at least one pair of colour control connections for the corresponding base colour, the electrodes of the other kind for all of the illuminating lines being connected together, forming a common electrode, and to at least one common control connection, wherein the first colour control connection of the at least one pair for each base colour is towards a first end of the line electrodes of this base colour and the second connection of the at least one pair is towards a second end of the same line electrodes of this base colour, the second end being opposite to the first end along the illuminating lines, the line electrodes of the same base colour being connected together at each of the two ends of the illuminating lines, wherein the three illuminating lines of the group of at least one backlighting unit allow a white colour to be produced for an observer by optical combination, and wherein the white balance is adjusted by controlling the respective luminous intensities of the different base colours simultaneously produced by the illuminating lines of this group.

\* \* \* \* \*